US009958359B2

(12) United States Patent
Usami

(10) Patent No.: US 9,958,359 B2
(45) Date of Patent: May 1, 2018

(54) TIRE PERFORMANCE TESTING APPARATUS

(71) Applicant: BRIDGESTONE CORPORATION, Tokyo (JP)

(72) Inventor: Koichi Usami, Kodaira (JP)

(73) Assignee: BRIDGESTONE CORPORATION, Tokyo (JP)

( * ) Notice: Subject to any disclaimer, the term of this patent is extended or adjusted under 35 U.S.C. 154(b) by 97 days.

(21) Appl. No.: 14/898,703

(22) PCT Filed: May 13, 2014

(86) PCT No.: PCT/JP2014/062703
§ 371 (c)(1),
(2) Date: Dec. 15, 2015

(87) PCT Pub. No.: WO2014/208211
PCT Pub. Date: Dec. 31, 2014

(65) Prior Publication Data
US 2016/0131554 A1    May 12, 2016

(30) Foreign Application Priority Data

Jun. 25, 2013  (JP) ................................. 2013-132552

(51) Int. Cl.
*G01M 17/02*    (2006.01)
*G01M 17/04*    (2006.01)
(Continued)

(52) U.S. Cl.
CPC .......... *G01M 17/02* (2013.01); *G01M 17/021* (2013.01); *G01M 17/04* (2013.01); *G01M 17/06* (2013.01); *G01M 7/08* (2013.01)

(58) Field of Classification Search
CPC ...... G01M 17/04; G01M 17/06; G01M 17/02; G01M 17/021; G01M 7/08
(Continued)

(56) References Cited

U.S. PATENT DOCUMENTS 4,002,051 A      1/1977  Hilbrands
7,302,825 B2 *  12/2007  Knox ..................... G01M 17/04
                                                       73/11.04
(Continued)

FOREIGN PATENT DOCUMENTS

CN          1920513 A    2/2007
CN        101187597 A    5/2008
(Continued)

OTHER PUBLICATIONS

Aug. 12, 2014 Search Report issued in International Patent Application No. PCT/JP2014/062703.
(Continued)

*Primary Examiner* — Randy Gibson
*Assistant Examiner* — Gedeon M Kidanu
(74) *Attorney, Agent, or Firm* — Oliff PLC

(57) ABSTRACT

A tire performance testing apparatus capable of reproducing conditions in which tire runs on actual road having a pothole, that is, conditions in which tire hits projection after moving in the air. The tire performance testing apparatus includes a tire running surface, a projection installing surface disposed on the front side of the end of the tire running surface in the traveling direction of a vehicle traveling on the tire running surface and positioned lower than the end of the tire running surface, and a projection disposed on the projection installing surface in such a manner as to protrude upward from the projection installing surface. And the distance between the end of the tire running surface and the projection is so set that the tire of a vehicle traveling on the (Continued)

tire running surface hits the projection after getting airborne away from the end of the tire running surface.

9 Claims, 2 Drawing Sheets

(51) Int. Cl.
*G01M 17/06* (2006.01)
*G01M 7/08* (2006.01)

(58) Field of Classification Search
USPC .......................................... 73/11.04, 146, 669
See application file for complete search history.

(56) References Cited

U.S. PATENT DOCUMENTS

| | | | | |
|---|---|---|---|---|
| 2006/0218999 | A1* | 10/2006 | Friske | G01M 17/022 73/146 |
| 2007/0044537 | A1* | 3/2007 | Knox | G01M 17/04 73/11.04 |
| 2007/0261469 | A1* | 11/2007 | Friske | G01M 17/022 73/11.08 |
| 2009/0000371 | A1* | 1/2009 | Hanada | G01M 17/022 73/146 |

FOREIGN PATENT DOCUMENTS

| | | | | |
|---|---|---|---|---|
| DE | 4431794 | A1 | 3/1996 | |
| DE | 102007006041 | * | 6/2008 | ............ G01M 17/06 |
| DE | 102007006041 | A1 | 6/2008 | |
| EP | 1757918 | A1 | 2/2007 | |
| JP | S61-254702 | A | 11/1986 | |
| JP | H06-45203 | Y2 | 11/1994 | |
| JP | 2006-030046 | A | 2/2006 | |
| JP | 2008-026132 | A | 2/2008 | |
| KR | 2005-0120262 | | 12/2005 | |
| KR | 2006-0041329 | | 5/2006 | |
| KR | 2011-0065793 | A | 6/2011 | |
| KR | 2012-0060562 | A | 6/2012 | |

OTHER PUBLICATIONS

Aug. 12, 2014 Written Opinion issued in International Patent Application No. PCT/JP2014/062703.

May 4, 2016 Extended Search Report issued in European Patent Application No. 14818819.6.

Feb. 5, 2018 Search Report issued in Chinese Patent Application No. 2014800364699.

* cited by examiner

TIRE PERFORMANCE TESTING APPARATUS

TECHNICAL FIELD

The present invention relates to a tire performance testing apparatus capable of reproducing conditions in which a tire hits a projection after moving in the air while it runs on an actual road.

BACKGROUND ART

There have been tire performance tests reproducing conditions in which a tire running on an actual road hits a projection. In one of such tests known, a projection is set on a tire running surface on which a tire runs, and the tire is made to climb over the projection (see Patent Document 1).

PRIOR ART DOCUMENT

Patent Document

Patent Document 1: Japanese Unexamined Patent Application Publication No. 2006-30046

SUMMARY OF THE INVENTION

Problems to be Solved by the Invention

Actual roads may have potholes which are depression holes in the road surface. And when a vehicle passes over such a pothole, there occur conditions in which a tire after moving in the air (getting airborne) hits a projection. Note that a projection herein refers to a projection protruding upward from the bottom of a pothole or the opening edge (rim) of the pothole.

During the passage of the vehicle over a pothole like this, the suspension of the vehicle is extended while the tire is moving in the air. On the other hand, in a tire performance test as described above, the tire hits the projection on a tire running surface with the suspension of the vehicle contracted.

As described above, there exists a difference in the state of the suspension of the vehicle between the case where the tire hits a projection after moving in the air and the case where the tire hits a projection present on the tire running surface. The conventional performance test cannot reproduce the running conditions on an actual road having a pothole present therein, that is, the running conditions of a tire hitting the projection after getting airborne. Hence, the conventional performance test could not be a tire performance test in response to the running conditions on an actual road having potholes.

The present invention, which can reproduce the running conditions on an actual road having a pothole, that is, the running conditions of a tire hitting the projection after moving in the air, provides a tire performance testing apparatus that can perform a tire performance evaluation in response to the running conditions on an actual road having a pothole therein.

Means for Solving the Problem

A tire performance testing apparatus according to the present invention includes a tire running surface, a projection installing surface disposed on the front side of the end of the tire running surface in the traveling direction of a vehicle traveling on the tire running surface and positioned lower than the end of the tire running surface, and a projection disposed on the projection installing surface in such a manner as to protrude upward from the projection installing surface. And the distance between the end of the tire running surface and the projection is so set that the tire of a vehicle traveling on the tire running surface hits the projection after moving in the air away from the end of the tire running surface. Therefore, the running conditions on an actual road having a pothole therein can be reproduced, and thus a tire performance testing apparatus capable of performing a tire performance evaluation in response to the running conditions on an actual road having potholes can be realized.

Hereinafter, the invention will be described based on preferred embodiments which do not intend to limit the scope of the claims of the present invention but exemplify the invention. All of the features and the combinations thereof described in the embodiments are not necessarily essential to the invention. The embodiments should be understood to include those consisting of selectively adopted features.

BEST MODE FOR CARRYING OUT THE INVENTION

First Embodiment

Figure 1:
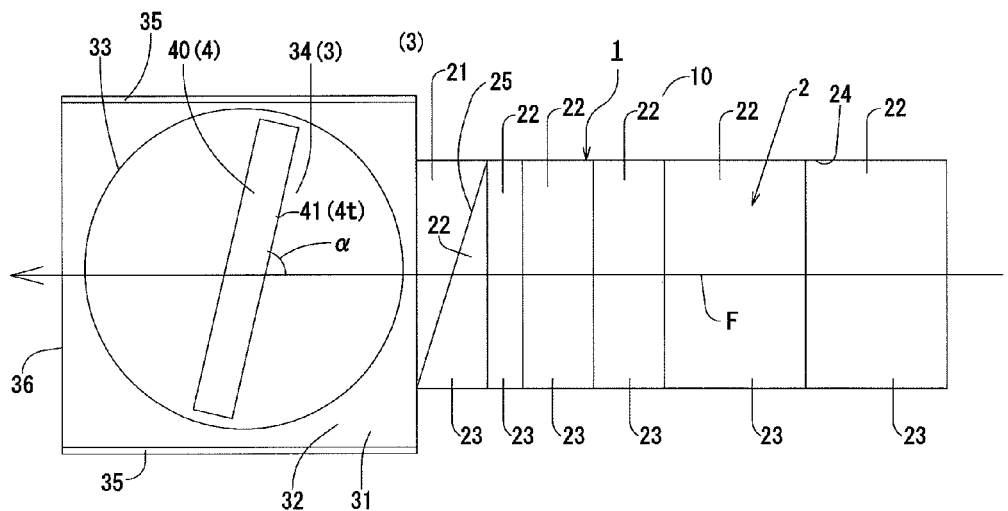
FIG. 1 is a plan view showing a tire performance testing apparatus.
Figure 2:
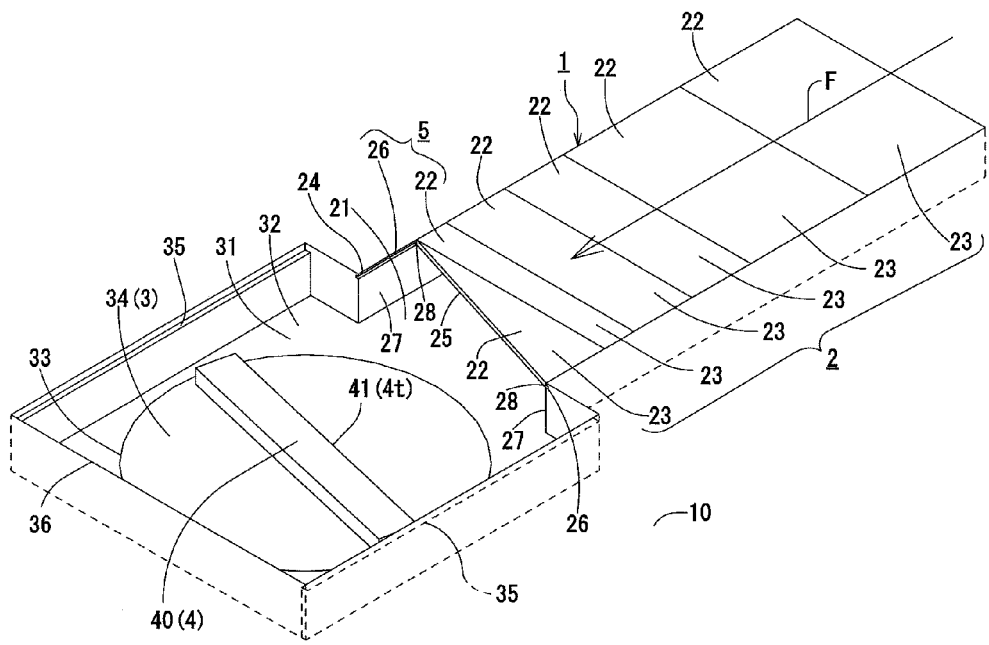
FIG. 2 is a perspective view showing a tire performance testing apparatus.

As shown in FIG. 1 and FIG. 2, a tire performance testing apparatus 1 includes a tire running surface 2, a projection installing surface 3, a projection 4, a distance adjusting means 5 for adjusting the distance between the end 25 of the tire running surface 2 and the projection 4, a projection height adjusting means for adjusting the height of the projection 4, and an angle adjusting means for adjusting the angle of intersection of the upper edge 4t of the projection 4 with the traveling direction F of the vehicle.

The tire running surface 2 is formed by plate surfaces 23, 23, . . . of a plurality of plates 22, 22, . . . such as steel plates so disposed as to cover the top opening 24 of a pocket 21 dug in the ground 10, such as a paved or dirt road for testing.

The projection installing surface 3 is formed by a plate surface 34 of a projection securing plate 33 fixed to a pocket bottom surface 32 of a pocket 31 formed by digging the ground 10, for instance. The projection securing plate 33 is formed by a circular plate, for instance.

The projection installing surface 3 is a surface located on the front side of the end 25 of the tire running surface 2 in the traveling direction F of a not-shown vehicle traveling on the tire running surface 2 and lower than the end 25 of the tire running surface 2.

It is to be noted that the pocket 21 and the pocket 31 are so formed as to be continuous with each other.

The projection 4 is installed on the projection installing surface 3 in such a manner that the upper edge 4t facing the end 25 of the tire running surface 2 is in parallel with the projection installing surface 3 and extends in a direction intersecting the traveling direction F of the vehicle traveling on the tire running surface 2.

The projection 4 is formed by one or more of metallic square bar member 40 having a square cross section, for instance. And the projection 4 is fixed to the projection installing surface 3 such that one square edge of the four peripheral square edges positioned in the uppermost position of the square bar member 40 becomes the above-mentioned upper edge 4t. Note that the upper edge 4t is preferably formed into a rounded shape by so-called chamfering, for instance.

More specifically, the tire performance testing apparatus 1 is configured such that the projection installing surface 3 is disposed on the pocket bottom surface 32 positioned on the front side of the end 25 of the tire running surface 2 in the traveling direction of the vehicle traveling on the tire running surface 2. This provides a difference in level between the end 25 of the tire running surface 2 and the projection installing surface 3, and the projection 4 is so installed as to protrude upward from the projection installing surface 3. And there is a distance between the end 25 of the tire running surface 2 and the projection 4 such that the tire 9 (see FIG. 3 and FIG. 4) of the vehicle traveling on the tire running surface 2 hits the upper edge 4t of the projection 4 after passing the end 25 of the tire running surface 2 and getting airborne. Thus there is a distance set between the end 25 of the tire running surface 2 and the projection 4.

A distance adjusting means 5 is a means so structured as to be capable of changing the distance between the end 25 of the tire running surface 2 and the projection 4 by increasing or decreasing the plurality of plates 22, 22, . . . which form the tire running surface 2. For example, the distance adjusting means 5 is so structured as to have mounting grooves 26, 26 formed in a pair of plate members 27, 27 disposed on a pair of mutually facing inner wall surfaces of the pocket 21 and the plurality of plates 22, 22, . . . which are detachably fitted to the mounting grooves 26, 26.

That is, according to the configuration provided with the distance adjusting means 5, the tire running surface 2 is formed with a pair of edge ends 28, 28 of each of the plurality of plates 22, 22, . . inserted into and supported by the mounting grooves 26, 26. And the distance between the end 25 of the tire running surface 2 and the projection 4 can be changed by increasing or decreasing the plates 22, 22, . . . .

The projection height adjusting means is comprised of the above-mentioned plurality of square bar members 40, 40, . . . which are stacked with the surfaces thereof butting each other and joined detachably by a not-shown joining means. And the height of the projection 4, which is the height from the projection installing surface 3 to the square edge 41 in the topmost position functioning as the upper edge 4t of the square bar member 40, can be adjusted by adjusting the number of the square bar members 40, 40, . . . to be stacked.

The height of the projection 4 is adjusted so that it is less than the height of the end 25 of the tire running surface 2, for instance.

If the height of the projection 4 is chosen to be about the same as the height of the end 25 of the tire running surface 2, then it is possible to reproduce, by the upper edge 4t of the projection 4, the opening edge of a pothole against which the tire of the vehicle passing over a pothole in an actual road bumps after moving in the air (the opening edge (rim) located on the front side of the opening edge of the pothole where the tire takes off in the traveling direction of the vehicle).

Also, if the height of the projection 4 is chosen to be less than the height of the end 25 of the tire running surface 2, then it is possible to reproduce, by the upper edge 4t of the projection 4, a protrusion inside a pothole against which the tire of the vehicle passing over the pothole in an actual road bumps after moving in the air.

The angle adjusting means is constructed such that the above-described projection 4 is detachably installed on the projection installing surface 3, for instance. As such, it is possible to change the angle of intersection of the upper edge 4t of the projection 4 with the traveling direction F of the vehicle traveling on the tire running surface 2.

It is to be noted that, as shown in FIGS. 1 and 2, the plate 22 constituting the end 25 of the tire running surface 2 is preferably so formed as to be parallel with the upper edge 4t of the projection 4. This makes the distance along the traveling direction F of the vehicle between the end 25 of the tire running surface 2 and the upper edge 4t of the projection 4 exactly the same in any position along the end 25 of the tire running surface 2 and the upper edge 4t of the projection 4. Therefore, even if there is some shift in the take-off position of the tire 9 of the vehicle traveling on the tire running surface 2 along the direction of the end 25 in each testing, the results will be obtained under the same testing conditions.

Specific Example

The dimension chosen for the level difference between the end 25 of the tire running surface 2 and the projection installing surface 3 was 16 cm.

The total length of the performance testing apparatus was 3 m 50 cm, and the width dimension of the tire running surface 2 was 1 m.

The projection height adjusting means, which consisted of 8 pieces of 2 cm-thick square bar member 40, was so configured as to be able to increase or decrease the height of the projection 4 at intervals of 2 cm. In this case, the height dimension from the projection installing surface 3 of the projection 4 to the upper edge 4t could be set to 16 cm by stacking the 8 pieces of square bar member 40, 40, . . . with the surfaces thereof butting each other. Thus it was possible to position the end 25 of the tire running surface 2 and the upper edge 4t of the projection 4 on the same horizontal plane.

Figure 3:
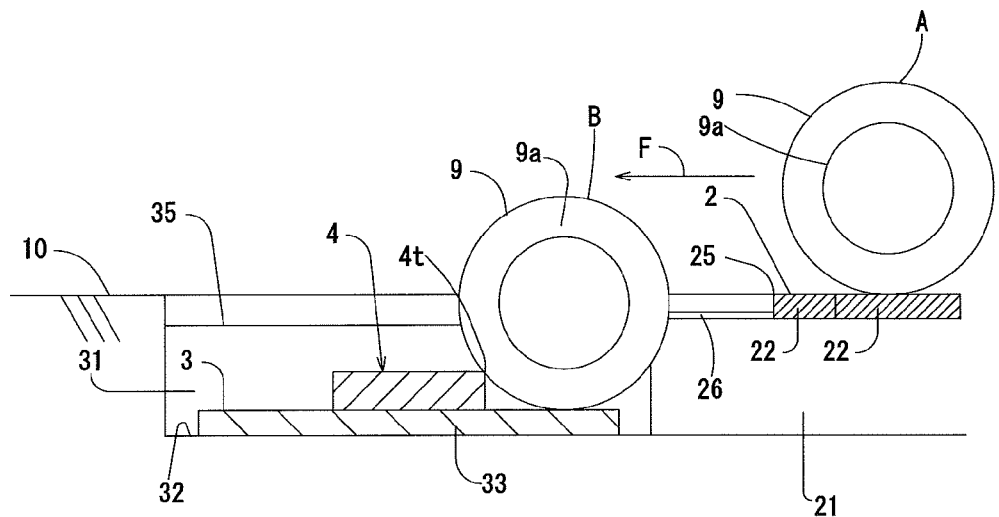
FIG. 3 is a cross-sectional view showing an example of a test using a tire performance testing apparatus.
Figure 4:
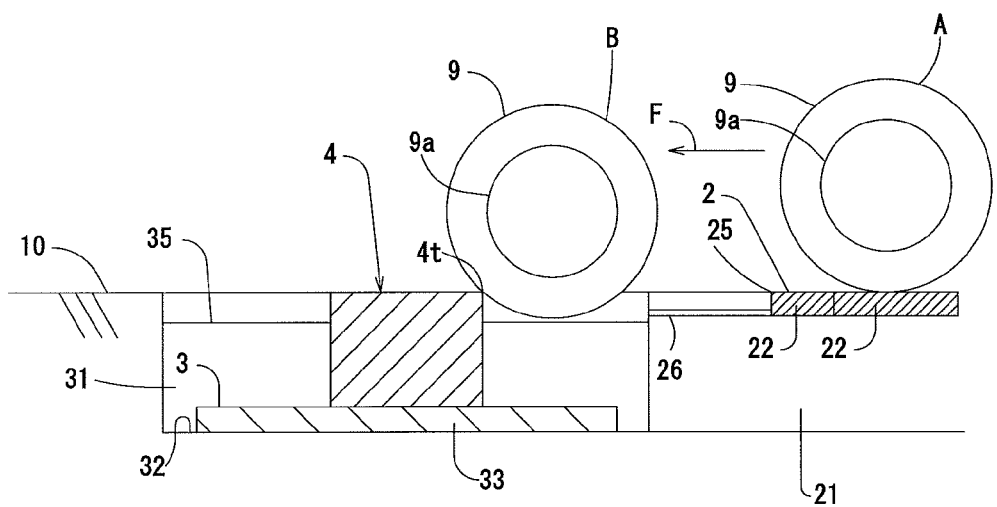
FIG. 4 is a cross-sectional view showing an example of a test using a tire performance testing apparatus.

With the projection height adjusting means provided, the upper edge 4t could be set lower than the end 25 of the tire running surface 2 as shown in FIG. 3, for instance. Also, the upper edge 4t could be set on the same horizontal plane as the end 25 of the tire running surface 2 as shown in FIG. 4.

The angle adjusting means was so configured as to be able to set the acute angle α of intersection of the upper edge 4t of the projection 4 with the traveling direction F of the vehicle traveling on the tire running surface 2 (see FIG. 1) to 85 degrees, 75 degrees, 45 degrees, and 15 degrees. The angle adjusting means can be realized, for example, by setting the installing positions for the projection 4, in advance, which allows the setting of the acute angle α to 85 degrees, 75 degrees, 45 degrees, or 15 degrees, on the projection installing surface 3 of the projection securing plate 33 fixed to the pocket bottom surface 32. Otherwise, the angle adjusting means may be realized by an arrangement in which the circular plate constituting the projection installing surface 3 can rotate around the center of the circular plate.

The distance adjusting means 5 was so configured that the plate 22 forming the end 25 of the tire running surface 2 has the end 25 in parallel with the upper edge 4t of the projection 4 which is set to a desired acute angle α by the angle adjusting means, for instance. In this configuration, the distance between the end 25 of the tire running surface 2 and the projection 4 can be lengthened by reducing the number of plates 22 other than the plate 22 having the end 25.

It is to be noted that the distance adjusting means 5 may, for instance, be so configured that all the plates 22, 22, . . . forming the tire running surface 2 are square plates having the sides thereof perpendicular to the traveling direction F of the vehicle. In such a configuration, the distance between the end 25 of the tire running surface 2 and the projection 4 can be lengthened by reducing the number of plates 22 from the side closer to the projection 4. In this case, it should be noted that the distance between the end 25 of the tire running surface 2 and the upper edge 4t of the projection 4 along the traveling direction F of the vehicle varies with the position in the direction along the end 25 of the tire running surface 2 and the upper edge 4t of the projection 4. This problem can be solved by taking care in each testing to have the vehicle run in the center of the tire running surface 2.

In a setting where the projection 4 is installed with the upper edge 4t thereof positioned lower than the end 25 of the tire running surface 2 as shown in FIG. 3, tests were conducted with the height from the projection installing surface 3 to the upper edge 4t being 6 cm, the acute angle α of the upper edge 4t intersecting with the traveling direction F of the vehicle being 75 degrees, the traveling speed of the vehicle being 50 to 85 km, and the tire size being 195/70. As a result, no pinch cuts were observed to occur in the tire 9.

In a setting where the projection 4 is installed with the upper edge 4t thereof positioned on the same horizontal plane with the end 25 of the tire running surface 2 as shown in FIG. 4, tests were conducted with the acute angle α of the upper edge 4t intersecting with the traveling direction F of the vehicle being 75 degrees, the traveling speed of the vehicle being 65 km, and the tire size being 195/70. As a result, pinch cuts were observed to occur in the buttress region of the tire 9.

In FIG. 3 and FIG. 4, A denotes the tire 9 running on the tire running surface 2, and B the tire 9 hitting the projection 4 after getting airborne away from the end 25 of the tire running surface 2.

Note that a pinch cut is a fissure (cracking) that occurs when a carcass cord in the tire 9 is severed and a part of the sidewall of the tire 9 swells under the air pressure. This pinch cut is caused when the side rubber of the tire 9 is caught between the rim 9a on which the tire 9 is fitted and the upper edge 4t of the projection 4.

That is, according to the results of the tests, pinch cuts do not occur in the tire 9 when the tire 9 comes in contact with the upper edge 4t of the projection 4 after landing on the projection installing surface 3 after moving in the air away from the end 25 of the tire running surface 2 as shown in FIG. 3. And pinch cuts occur in the tire 9 when the tire 9 comes in contact with the upper edge 4t of the projection 4 after moving in the air away from the end 25 of the tire running surface 2 as shown in FIG. 4.

From this, it was found that when a vehicle passes over a pothole present in an actual road, pinch cuts seldom occur if the tire hits a projection inside the pothole or the opening edge of the pothole after landing on the projection installing surface 3 after moving in the air. Also, it was found that pinch cuts are likely to occur if the tire hits a projection inside the pothole or the opening edge of the pothole without landing on the projection installing surface 3 after getting airborne.

Accordingly, a tire performance testing apparatus 1 could be realized which can reproduce conditions likely to cause pinch cuts. And this made it possible to obtain various data useful in designing and manufacturing tires with durability causing no pinch cuts.

With the tire performance testing apparatus 1 of a structure as described above, the tire 9 of a vehicle traveling on the tire running surface 2 gets airborne from the end 25 of the tire running surface 2 and then hits the projection 4. Hence, it is possible to reproduce the same conditions as when the tire 9 of a vehicle passing over a pothole in an actual road hits a projection protruding upward from the bottom of the pothole or the rim (opening edge) of the pothole.

In other words, it is possible to reproduce the running conditions of a tire on an actual road with a pothole therein, that is, the running conditions of a tire 9 hitting a projection 4 after moving in the air. And this enables a tire performance evaluation to be carried out in accordance with the running conditions of a tire on an actual road with a pothole therein.

Also, a distance adjusting means 5 is provided to adjust the distance between the end 25 of the tire running surface 2 and the projection 4. As a result, it is now possible to reproduce the varied sizes of the pothole present in a road. And this enables the tire performance evaluation to be carried out for the varied sizes of the pothole present in a road.

Also, a projection height adjusting means is provided to adjust the height of the projection 4. As a result, it is possible to reproduce the varied conditions of the projection inside of the pothole or the rim of the pothole present in a road. And this enables the tire performance evaluation to be carried out for the varied conditions of the projection inside of the pothole or the rim of the pothole present in the road.

Also, the projection 4 is installed on the projection installing surface 3 in such a manner that the upper edge 4t thereof facing the end 25 of the tire running surface 2 is in parallel with the projection installing surface 3 and extends in a direction intersecting the traveling direction F of the vehicle traveling on the tire running surface 2. As a result, it is possible to reproduce the varied conditions of the projection inside of the pothole or the rim of the pothole present in the road. And this enables the tire performance evaluation to be carried out for the varied conditions of the projection inside of the pothole or the rim of the pothole present in the road.

Furthermore, an angle adjusting means is provided to adjust the angle of intersection of the upper edge 4t of the projection 4 with the traveling direction F of the vehicle. As a result, the angle of intersection of the upper edge 4t of the projection 4 with the traveling direction F of the vehicle can be changed easily, which makes it possible to reproduce the varied conditions of the projection inside of the pothole or the rim of the pothole present in the road. And this enables the tire performance evaluation to be carried out for the varied conditions of the projection inside of the pothole or the rim of the pothole present in the road.

In other words, the tire performance test using a tire performance testing apparatus 1 can produce various data useful in designing and manufacturing tires with durability that do not cause pinch cuts in the running on an actual road with pot holes present therein.

Also, a plate surface 34 of a projection securing plate 33, such as a circular plate, for instance, is used to constitute a projection installing surface 3. As a result, fixing the projection 4 to the projection installing surface 3 or changing the angle of intersection of the upper edge 4t of the projection 4 with the traveling direction F of the vehicle traveling on the tire running surface 2 can be performed easily and accurately.

Also, cover supports 35, 35 to support a not-shown cover plate may be provided on the inner walls facing each other of the pocket 31 such that the upper surface of the cover plate covering the top opening of the pocket 31 is positioned on the same plane with the tire running surface 2. Then, with a projection installed on the upper surface of the cover plate, a tire performance test can be performed by reproducing the conditions in which a tire running on a road hits a projection protruding from the road surface.

Second Embodiment

A pocket bottom surface 32 of a pocket 31 formed by digging the ground 10 may be used as a projection installing surface 3. And a projection 4 may be installed on the pocket bottom surface 32 functioning as the projection installing surface 3.

Third Embodiment

A tire performance testing apparatus 1 may be so configured that the projection installing surface 3 is formed by a plate surface 34 of a projection securing plate 33 fixed to the ground 10 or by the ground 10. At the same time, the tire running surface 2 may be formed in a position higher than the ground 10. And the projection 4 may be secured to a projection installing surface 3 which is a surface located on the front side of the end 25 of the tire running surface 2 in the traveling direction F of the vehicle and lower than the end 25 of the tire running surface 2. And the upper edge of the projection 4 may be disposed in a position lower than the height of the end 25 of the tire running surface 2.

With the tire performance testing apparatus 1 configured as described above, the distance between the end 25 of the tire running surface 2 and the projection 4 may be changed by shifting the tire running surface 2 or the projection 4.

Fourth Embodiment

The height of the projection 4 may be adjusted by preparing a plurality of projections 4 having different heights and switching among the projections 4.

It is to be noted that the tire performance testing apparatus according to the present invention places no particular limitations on the material and shape of the projection 4. Also, there is no particular limitation on the shape of the upper edge 4t of the projection 4.

Also, the tire performance testing apparatus according to the present invention may be so configured that the upper edge 4t of the projection 4 installed on the projection installing surface 3 is located higher than the end 25 of the tire running surface 2. In such a configuration, it is possible to reproduce a pothole present in an actual road whose rim the tire of the vehicle passing over the pothole hits after getting airborne is higher than the rim of the pothole from which the tire takes off. And this enables a tire performance evaluation to be carried out for the conditions where the tire runs over such a pot hole.

DESCRIPTION OF REFERENCE NUMERALS 1 tire performance testing apparatus
2 tire running surface
3 projection installing surface
4 projection
4t upper edge of projection
5 distance adjusting means
9 tire
25 end of tire running surface

The invention claimed is:

1. A tire performance testing apparatus comprising:
a discontinuous tire running surface formed by a plurality of plates;
a projection installing surface disposed on a front side of an end of the tire running surface in a traveling direction of a vehicle traveling on the tire running surface, the projection installing surface being positioned lower than the end of the tire running surface; and
a projection disposed on the projection installing surface such that: (i) the projection protrudes upward from the projection installing surface, (ii) a distance between the end of the tire running surface and the projection is set such that a tire of the vehicle traveling on the tire running surface contacts the projection after becoming airborne from the end of the tire running surface, and (iii) an upper edge of the projection faces the end of the tire running surface.

2. The tire performance testing apparatus according to claim 1, further comprising a plurality of square bar members to adjust a height of the projection.

3. The tire performance testing apparatus according to claim 2, wherein the projection is formed by the plurality of square bars and installed on the projection installing surface in such a manner that the upper edge facing the end of the tire running surface is in parallel with the projection installing surface and extends in a direction intersecting the traveling direction of the vehicle traveling on the tire running surface.

4. The tire performance testing apparatus according to claim 1, wherein the projection is formed by a square bar and installed on the projection installing surface in such a manner that the upper edge facing the end of the tire running surface is in parallel with the projection installing surface and extends in a direction intersecting the traveling direction of the vehicle traveling on the tire running surface.

5. The tire performance testing apparatus according to claim 4, wherein the projection is detachably installed on the projection installing surface to adjust an angle of intersection of the upper edge of the projection with the traveling direction of the vehicle.

6. The tire performance testing apparatus according to claim 1, further comprising a plurality of mounting grooves in which the plurality of plates are detachably fitted to adjust the distance between the end of the tire running surface and the projection.

7. The tire performance testing apparatus according to claim 6, wherein the projection is formed by a square bar and installed on the projection installing surface in such a manner that the upper edge facing the end of the tire running surface is in parallel with the projection installing surface and extends in a direction intersecting the traveling direction of the vehicle traveling on the tire running surface.

8. The tire performance testing apparatus according to claim 6, further comprising a plurality of square bar members to adjust a height of the projection.

9. The tire performance testing apparatus according to claim 8, wherein the projection is formed by the plurality of square bars and installed on the projection installing surface in such a manner that the upper edge facing the end of the tire running surface is in parallel with the projection installing surface and extends in a direction intersecting the traveling direction of the vehicle traveling on the tire running surface.

* * * * *